United States Patent
Öhman

(10) Patent No.: US 10,593,204 B2
(45) Date of Patent: Mar. 17, 2020

(54) METHOD FOR DETECTING AN UPCOMING ROAD SITUATION FOR A VEHICLE

(71) Applicant: VOLVO TRUCK CORPORATION, Göteborg (SE)

(72) Inventor: Mikaela Öhman, Göteborg (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 44 days.

(21) Appl. No.: 15/776,087

(22) PCT Filed: Nov. 17, 2015

(86) PCT No.: PCT/EP2015/076779
§ 371 (c)(1),
(2) Date: May 15, 2018

(87) PCT Pub. No.: WO2017/084697
PCT Pub. Date: May 26, 2017

(65) Prior Publication Data
US 2018/0322781 A1    Nov. 8, 2018

(51) Int. Cl.
*G08G 1/0967* (2006.01)
*G08G 1/01* (2006.01)
(Continued)

(52) U.S. Cl.
CPC .......... *G08G 1/096716* (2013.01); *B60L 9/00* (2013.01); *B60L 53/00* (2019.02);
(Continued)

(58) Field of Classification Search
None
See application file for complete search history.

(56) References Cited

U.S. PATENT DOCUMENTS

| | | | |
|---|---|---|---|
| 5,573,090 A | 11/1996 | Ross | |
| 2008/0119966 A1* | 5/2008 | Breed | G07C 5/008 701/2 |

(Continued)

FOREIGN PATENT DOCUMENTS

| | | |
|---|---|---|
| EP | 1313078 A2 | 5/2003 |
| JP | 2001126196 A | 5/2001 |

(Continued)

OTHER PUBLICATIONS

Internatiaonal Search Report (dated Jul. 20, 2016) for corresponding International App. PCT/EP2015/076779.

(Continued)

*Primary Examiner* — Richard M Camby
(74) *Attorney, Agent, or Firm* — Venable LLP; Jeffri A. Kaminski

(57) ABSTRACT

A method for detecting an upcoming road situation for a vehicle is provided, the vehicle including a control unit having a receiver configured to receive transmitted data from road system components along a road for the vehicle, wherein the method includes the steps of: receiving a signal from at least one electrical charge segment along the road, the signal being indicative of a present operational status of the at least one electrical charge segment; comparing the present operational status of the at least one electrical charge segment with a predetermined set of rules; and determining that the upcoming road situation at the at least one electrical charge segment ahead of the vehicle constitutes an increased safety risk for the vehicle if the present operational status of the at least one electrical charge segment ahead of the vehicle fails to fulfil at least one of the predetermined set of rules.

16 Claims, 4 Drawing Sheets

(51) Int. Cl.
*G08G 1/052* (2006.01)
*G08G 1/048* (2006.01)
*B60L 53/00* (2019.01)
*B60L 9/00* (2019.01)
*B60M 1/00* (2006.01)

(52) U.S. Cl.
CPC ............ *B60M 1/00* (2013.01); *G08G 1/0116* (2013.01); *G08G 1/0133* (2013.01); *G08G 1/048* (2013.01); *G08G 1/052* (2013.01); *G08G 1/096783* (2013.01); *Y02T 10/7005* (2013.01); *Y02T 10/7072* (2013.01); *Y02T 90/14* (2013.01)

(56) References Cited

U.S. PATENT DOCUMENTS

| | | |
|---|---|---|
| 2012/0067684 A1 | 3/2012 | Asplund |
| 2015/0041273 A1 | 2/2015 | Klein et al. |

FOREIGN PATENT DOCUMENTS

| | | |
|---|---|---|
| JP | 2001128304 A | 5/2001 |
| JP | 2006171967 A | 6/2006 |
| JP | 2009098832 A | 5/2009 |
| WO | 2013091875 A2 | 6/2013 |
| WO | 2014073900 A1 | 5/2014 |

OTHER PUBLICATIONS

Notice of Reasons for Refusal dated Oct. 8, 2019 in corresponding JP Application No. 2018-544400, 7 pages.

* cited by examiner

METHOD FOR DETECTING AN UPCOMING ROAD SITUATION FOR A VEHICLE

BACKGROUND AND SUMMARY

The present invention relates to a method for detecting an upcoming road situation for a vehicle. The invention also relates to a control unit configured to detect an upcoming road situation for a vehicle and a vehicle comprising such a control unit. The invention is applicable for vehicles, such as e.g. low-, medium- and heavy duty vehicles also commonly referred to as trucks. Although the invention will mainly be described in relation to a truck, it may also be applicable for other types of vehicles such as e.g. cars, etc.

Electrical driven vehicles are becoming increasingly popular since the demand on e.g, pollution etc. is continuously increasing from the market. An approach of electrical driven vehicles is to provide charging from charge segments positioned in e.g. the road where the vehicle is driven. These systems are often referred to as electrical road systems (ERS) and the vehicles are thus referred to as ERS-vehicles. These vehicles often comprise a conductor that is arranged to be positioned in contact with the charge segments of the road in order to receive charge current therefrom.

For safety reasons the charge segments are provided with electrical charge current only within a short time period before the ERS-vehicle arrives at the charge segment. The reason is that e.g. pedestrians or animals should not be able to touch a charge segment which is provided with electrical charge current. Accordingly, the charge segments are continuously switched on and off but the ERS-vehicle continuously receives charge current since the charge segments are turned on when the ERS-vehicle arrives at the respective segment. Hence, the charge segments are controllably supplied with electrical charge current for charging the vehicle. The electrical road system is thus able to detect the vehicle in order to decide when to turn on the electrical charge current.

Although the electrical charge segments receive information that an ERS-vehicle is located in the vicinity thereof, the interaction between the electrical charge segments and the vehicle is still in need of further improvements.

It is to provide a method that improves detection of an upcoming road situation in comparison to the prior art.

According to a first aspect of the present invention, there is provided a method for detecting an upcoming road situation for a vehicle, the vehicle comprising a control unit having a receiver configured to receive transmitted data from road system components along a road for the vehicle, wherein the method comprises the steps of receiving a signal from at least one electrical charge segment along the road, the signal being indicative of a present operational status of the at least one electrical charge segment; comparing the present operational status of the at least one electrical charge segment with a predetermined set of rules; and determining that the upcoming road situation at the at least one electrical charge segment ahead of the vehicle constitutes an increased safety risk for the vehicle if the present operational status of the at least one electrical charge segment ahead of the vehicle fails to fulfil at least one of the predetermined set of rules.

The wording "upcoming road situation" should be understood to mean that something has occurred ahead of the vehicle which may constitute a safety risk for the vehicle. For example, other vehicles ahead of the present vehicle are standing still due to e.g. a traffic accident, or that the road surface is icy, etc. These road situations may be associated with an increased safety risk if the vehicle operator, or the vehicle's active safety system, is unaware of the situation. The upcoming road situation is thus relating to the road ahead of the vehicle.

Furthermore, the wording "present operational status" of the at least one electrical charge segment should be understood to mean information that the electrical charge segment can receive from the vicinity thereof, such as the surrounding traffic situation at the electrical charge segment, etc. The wording also relates to property characteristics of the electrical charge segment, such as the temperature of the electrical charge segment, etc. Further detailed example embodiments of different present operational status of the electrical charge segments will be given below.

Still further, the wording "predetermined set of rules" should be understood to relate to rules which are specific for the specific and received present operational status of the electrical charge segments. Hence, there are different rules depending on the specific information received from the electrical charge segments. If, for example, a signal is received which indicates a specific surface temperature of the electrical charge segment, the predetermined rule may be a minimum temperature limit that may indicate that the road surface is icy and/or slippery. Detailed example embodiments of various predetermined set of rules are described further below.

Failure to fulfil at least one of the predetermined set of rules thus indicates that there is an increased safety risk for the vehicle at a position thereof.

The received signal indicative of the present operational status of the at least one electrical charge segment may be transmitted by wireless communication from each of the electrical charge segments along the road and received by e.g. the control unit of the vehicle. Any suitable technique known by the skilled person may be used for the wireless communication, such as e.g. Bluetooth, Wi-Fi, 3G/4G, laser signals, ultrasound signals, etc. Other alternatives are of course conceivable, the signal can, for example, be transmitted as a chain between consecutively arranged electrical charge segments of the road until it is received by the control unit of the vehicle. Furthermore, it should be understood that the invention is not limited to a situation where each of the electrical charge segments directly transmits a signal to the vehicle, the electrical charge segments may equally as well provide a signal, by wire or wireless, to a central control unit which analyses the signal and wirelessly transmits a signal to the vehicle with information relating to the present operational status of the electrical charge segments. Hence, the received signal may be received directly or indirectly from the electrical charge segments.

An advantage is that a hazardous traffic situation can be detected at an early point in time in comparison to e.g. standard forward-looking data collection systems, such as e.g. cameras, LIDAR, radar, etc. Hereby, the vehicle can be aware of the traffic situation at all positions of the road provided with the individually controlled electrical charge segments. A further advantage is thus that the vehicle, or the operator of the vehicle, is given proper information for planning the route ahead of the vehicle for being prepared for the upcoming situation, i.e. the operator will be given an increased awareness of the risk ahead of the vehicle. Hence, the invention provides for a dynamic update of the upcoming road situation which can be used in e.g. active safety systems of the vehicle, etc.

Furthermore, the present invention can be used in conjunction with existing active safety systems. In such a case, the present invention can be used as a compliment if, for example, camera vision, radar vision, laser vision, etc. is unable to track or identify a road situation constituting an increased safety risk for the vehicle. Also, the present invention may be utilized for verifying that existing road surveillance systems function properly. Hereby, the method may comprise the steps of receiving a signal from a road surveillance system of the road, the signal being indicative of an upcoming road situation, comparing the signal indicative of the upcoming road situation with the received signal of the operational status of at least one electrical charge segment positioned at the determined upcoming road situation, and determine that the signal indicative of the upcoming road situation is correct if the signal substantially corresponds to the received signal of the operational status of the at least one electrical charge segment.

According to an example embodiment, the received signal of the present operational status of the at least one electrical charge segment may comprise information relating to road specific events at the at least one electrical charge segment.

A road specific event should be understood to mean an event that takes place at the electrical charge segment. For example, traffic situation, icy road conditions, dynamic speed limits, road work, etc. may constitute various types of road specific events.

According to an example embodiment, the predetermined set of rules may comprise a road specific reference value determining a safety risk for the vehicle.

The road specific reference value may relate to the surrounding environment of the electrical charge segment or to conditions of the electrical charge segment. These reference values determine that there is an increased safety risk for the vehicle. For example, the road specific reference value may relate to vehicle speed for the vehicle(s) located at the electrical charge segments. The road specific reference value may be determined to constitute a safety risk for the vehicle if the speed of the vehicle(s) located at the electrical charge segment is below a predetermined threshold speed limit. The predetermined threshold speed limit may depend on e.g. the maximum allowable speed limit at the electrical charge segment, where the predetermined threshold speed limit is higher for a higher maximum allowable speed limit of the road. The road specific reference value may also relate to the surface temperature of the electrical charge segment, where it is determined to be a safety risk for the vehicle if the surface temperature of the electrical charge segment is below a predetermined threshold temperature limit. Other road specific reference values are of course conceivable and further examples will be given below.

According to an example embodiment, the method may comprise the steps of determining a distance from a current position of the vehicle to the position of the electrical charge segment determined to constitute an increased safety risk for the vehicle; and controlling the vehicle speed for the vehicle to be reduced at a predetermined distance before the vehicle arrives at the electrical charge segment.

Hereby, the vehicle operator does not need to take action of the vehicle which instead automatically reduces the speed of the vehicle well in time before it arrives at the position determined to constitute an increased safety risk.

According to an example embodiment, the method may comprise the step of providing a signal to a Human-Machine Interface (HMI) of the vehicle for warning a vehicle operator of the increased safety risk for the vehicle.

An advantage is that the operator can be given information of the traffic situation ahead of the vehicle. The operator may than, for example, determine to slow down before arriving at the position of the electrical charge segment constituting an increased safety risk, or decide to reroute the vehicle.

According to an example embodiment, the signal indicative of a present operational status of the at least one electrical charge segment may comprise an indication of a change of a structure property of the electrical charge segment.

Hereby, if it is determined that a structure property of the electrical charge segment has changed, this can be determined to be associated with a hazardous traffic situation. The change of a structure property is thus associated with a predetermined rule indicating when the change is determined to be associated with an increased safety risk.

According to an example embodiment, the change of a structure property of the electrical charge segment may comprise a change in electrical or mechanical properties of the electrical charge segment.

Changes in electrical properties, such as changes in capacitance, resistance, conductivity, impedance, etc. can indicate corrosion accumulation, snow deposits and other accumulated or instantaneous precipitation measurements that may constitute an increased safety risk for approaching vehicles. A change in electrical property may arise due to e.g. chemical spills, such as e.g. diesel, petrol or oil, on the electrical charge segment. Furthermore, a change in electrical properties may also be caused by severe amounts of water which can cause aquaplaning etc.

Changes in mechanical properties, such as vibration frequency shifts, mechanical stress, deformation of the electrical charge segments, etc. may imply that the ground surface beneath the electrical charge segment changes due to e.g. soil erosion rich may cause an uneven road surface or even a deformation of the road, such as a pothole, sink hole, etc.

Furthermore, a change in electrical or mechanical properties can be used to detect the presence of pedestrians or animals at the electrical charge segment. For example, a change in capacitance may indicate the presence of a pedestrian/animal on the electrical charge segment, or a change in vibration of the electrical charge segment may indicate the presence of a pedestrian/animal in the vicinity of the electrical charge segment.

According to an example embodiment, the signal indicative of a present operational status of the at least one electrical charge segment may comprise an indication of a surface temperature of the electrical charge segment.

Hereby, and as described above, if the surface temperature of the electrical charge segment is below a predetermined threshold limit, this may e.g. indicate that the road surface is icy and slippery.

According to an example embodiment, the signal indicative of a present operational status of the at least one electrical charge segment may comprise vehicle speed data for vehicles located at the at least one electrical charge segment.

Hereby, and as described above, if vehicles located at the electrical charge segment are driving below a predetermined threshold limit, this may imply that something has happened. Slow traffic, or stopped traffic, may by itself constitute a safety risk for the vehicle.

According to an example embodiment, the predetermined set of rules may comprise at least one of a minimum allowable vehicle speed level, maximum deceleration ratio level, or minimum distance to next coming vehicle on the road.

Hence, if the vehicles present at the electrical charge segments are traveling with too slow vehicle speed, decelerate too severely, or are driving to close to each other, this may constitute a safety risk or hazardous traffic situation for the approaching vehicle.

According to a second aspect of the present invention, there is provided a control unit configured to detect an upcoming road situation for a vehicle, the control unit comprising a receiver configured to receive transmitted data from road system components along a road for the vehicle, wherein the control unit is configured to receive a signal from at least one electrical charge segment along the road, the signal being indicative of a present operational status of the at least one electrical charge segment; compare the present operational status of the at least one electrical charge segment with a predetermined set of rules; and determine that the upcoming road situation at the at least one electrical charge segment ahead of the vehicle constitutes an increased safety risk for the vehicle if the present operational status of the at least one electrical charge segment ahead of the vehicle fails to fulfil at least one of the predetermined set of rules.

Effects and features of the second aspect are largely analogous to those described above in relation to the first aspect of the present invention.

According to a third aspect of the present invention, there is provided a computer program comprising program code means for performing any of the steps described above in relation to the first aspect when the computer program is run on a computer.

According to a fourth aspect of the present invention, there is provided a computer readable medium carrying a computer program comprising program means for performing any of the steps described above in relation to the first aspect when the program means is run on a computer.

According to a fifth aspect of the present invention, there is provided a vehicle comprising a control unit as described above in relation to the second aspect of the present invention.

It is thus to be understood that the vehicle should be able to receive data from electrical charge segments and/or a central control unit of an electrical road system. The vehicle may, for example, be an ERS-vehicle.

According to an example embodiment, the vehicle may further comprise a charging component adapted to receive electrical charge current from individually controlled electrical charge segments along a road, wherein the charging component is controlled by means of the control unit.

According to an example embodiment, the charging component may be adapted to conductively receive charge current from the individually controlled electrical charge segments along the road.

According to an example embodiment, the control unit may be configured to controllably direct the charging component towards the electrical charge segments along the road.

According to an example embodiment, the charging component may be positioned below the longitudinal frame of the vehicle, wherein the control unit is adapted to controllably direct the charging component towards electrical charge segments positioned in the ground surface of the road. Hereby, the vehicle receives electrical charge current from electrical charge segments positioned in the ground surface. It should however be understood that the electrical charge segments may be arranged on e.g. the safety fence of the road. In such situation, the charging component is preferably positioned on the side of the vehicle. Other alternatives are of course also conceivable.

Further effects and features of the fifth aspect are largely analogous to those described above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional features and advantages of the present invention, will better understood through the following illustrative and non-limiting detailed description of exemplary embodiments of the present invention, wherein.

DETAILED DESCRIPTION

Figure 1:
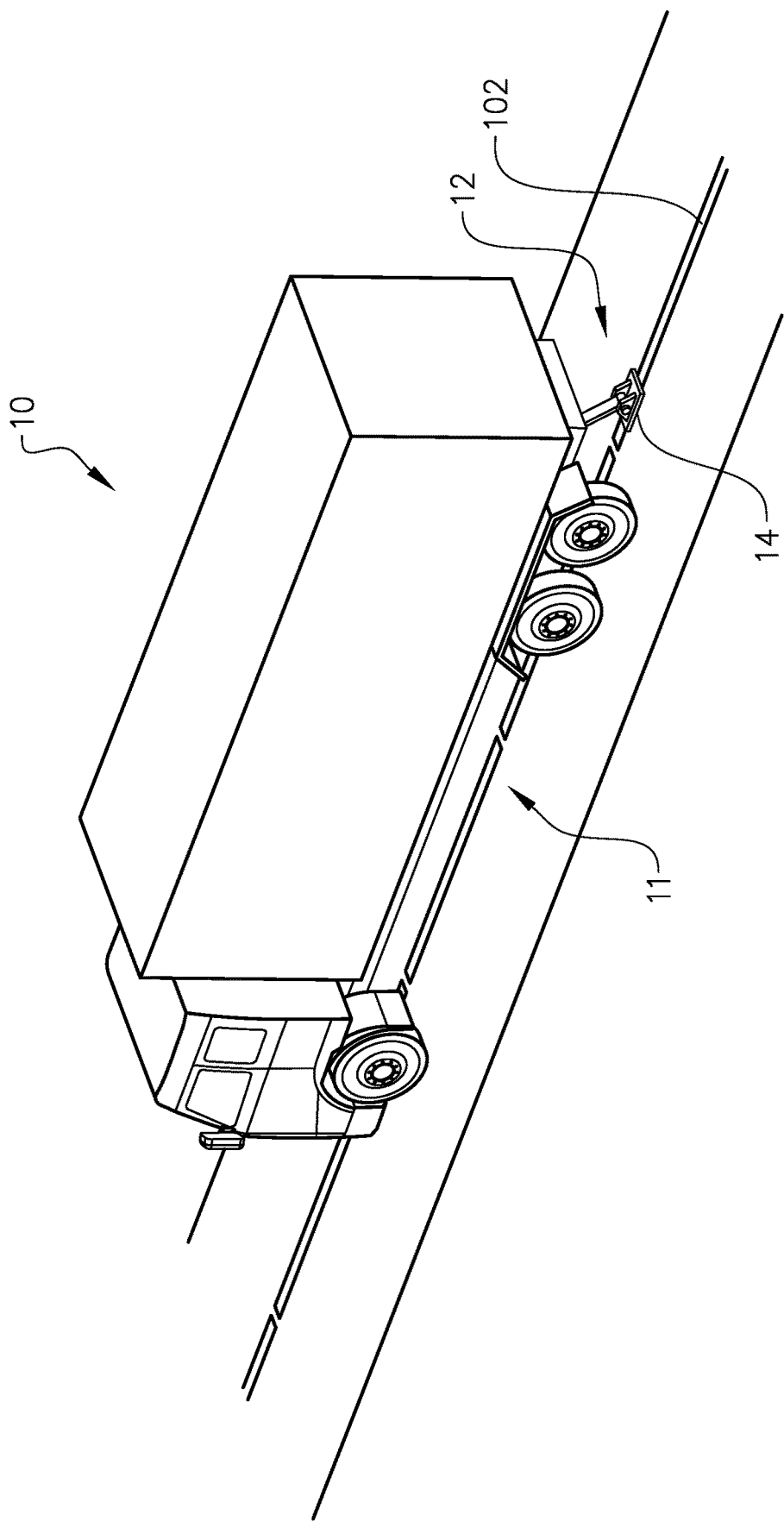
FIG. 1 is a perspective view of a vehicle according to an example embodiment driving on a road provided with a plurality of electrical charge segments.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 2:
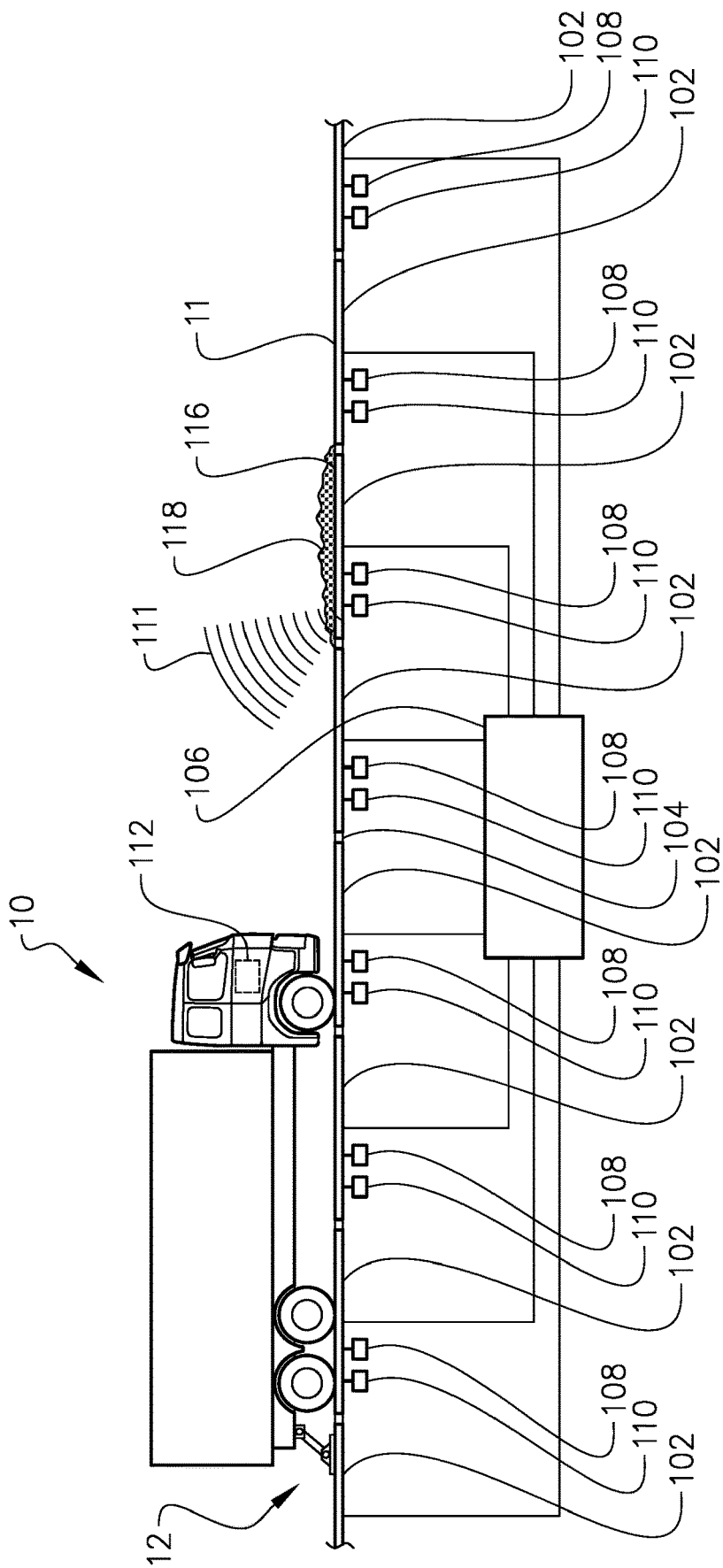
FIG. 2 is a schematic side view illustrating an example embodiment of the plurality of electrical charge segments along the road and their interaction with the vehicle.

FIG. 1 is a perspective view of a vehicle 10 according to an example embodiment driving on a road 11 provided with a plurality of electrical charge segments 102 which will be described in further detail with reference to FIG. 2 below. The present invention should not be construed as limited to a vehicle adapted to receive electrical charge current from the plurality of electrical charge segments 102 of the road 11, although the vehicle should be able to receive transmitted data from the electrical charge segments 102, or a central control unit 106, of the road 11 which will also be described in further detail below with reference to FIGS. 2 and 3. The following will, however, describe the present invention by means of a vehicle 10 receiving electrical charge current from the electrical charge segments 102 as depicted in FIGS. 1 and 2.

The vehicle 10 is in FIG. 1 depicted as a truck which preferably is an electric vehicle or a hybrid electric vehicle. The truck comprises a charging component 12 which is arranged to receive electrical charge current from the electrical charge segments 102. In detail, the charging component 12 is configured to be positioned in an inactive position where no contact is present between the electrical charge segments 102 and a current collector 14 of the charging component 12, and in an operative condition where the current collector 14 and the electrical charge segments 102 are in physical contact with each other. Hence, in the inactive position the charging component 12 is lifted upwardly towards the vehicle, and in the operative condition the charging component 12 is lowered downwardly for contacting the electrical charge segments 102 of the road 11.

The vehicle 10 depicted in FIG. 1 thus conductively receives electrical charge current from the electrical charge segments 102 along the road 11. However, inductive charging may function equally as well and conductive charging thus only serves as an illustrative example.

Furthermore, the present invention should not be construed as limited to electrical charge segments 102 positioned below the vehicle 10 on the ground surface as depicted in FIG. 1. The invention should be understood to function equally as well with electrical charge segments 102 arranged e.g. beside the vehicle on a safety fence or the like, i.e. a side-rail charging system. The charging component 12 is in the latter situation substantially horizontally movable between the inactive position and the operative condition. If the charge segments 102 are positioned below the vehicle 10 on the ground as depicted in the figures, the charging component 12 is substantially vertically movable between the inactive position and the operative condition.

Reference is now made to FIG. 2 which is a schematic side view illustrating an example embodiment of the plurality of electrical charge segments 102 along the road 11 and their interaction with the vehicle 10. As depicted, the road 11 comprises a plurality of electrical charge segments 102 which are arranged at predetermined intervals relative to each other along the road 11. An electrical isolation 104 is arranged between two consecutive electrical charge segments 102 for preventing leakage current between consecutively arranged charge segments 102. Furthermore, the electrical charge segments 102 are each connected to a central control unit 106. The central control unit 106 is configured to controllably supply electrical current to each of the electrical charge segments 102. The central control unit 106 can also be arranged to receive data from each of the electrical charge segments 102 with information relating to e.g. their present operational status, i.e. if the surrounding traffic at the respective electrical charge segment 102 is such that the electrical charge segment 102 is able/unable to supply electrical charge current to vehicles arriving thereto. The plurality of electrical charge segments 102 and the control unit 106 thus constitutes road system components of the road 11. The control unit 106 may also receive data relating to the physical properties of the electrical charge segments 102 such as e.g. mechanical and/or electrical property related data of the electrical charge segments 102. The electrical charge segments 102 may alternatively receive electrical charge current from another power supply (not shown) where the central control unit 106 is arranged to control when each of the electrical charge segments 102 is allowed to receive charge current from the power supply.

Furthermore, each of the electrical charge segments 102 comprises means 108 for detecting that a vehicle is approaching or is present at the respective electrical charge segment 102, which means may be a sensor or camera etc. The means 108 for detecting an approaching, or present, vehicle 10 may also be adapted to determine the vehicle speed of the approaching vehicle. Other alternatives are also conceivable, such as a Radio Frequency (RF) signal transmitted from the vehicle. The RF signal can be received by the means 108 for detecting the vehicle or by another receiver provided in connection to the respective electrical charge segments 102.

Still further, each of the electrical charge segments 102 comprises a transmitter 110 which is arranged to transmit a signal 111 to the approaching vehicles 10. The transmitted signal 111 may comprise data information relating to the present operational status of each of the electrical charge segments 102, which present operational status will be described further below. It should be readily understood that although FIG. 2 only illustrates that one of the electrical charge segments transmits data, all of the electrical charge segments 102 along the road is able to transmit data relating to their respective present operational status. Furthermore, the transmitters 110 may form an integral part of the respective electrical charge segment 102, i.e. they may be arranged in the respective electrical charge segments 102. The arrangement in FIG. 2, where the transmitters 110 are arranged as an external part connected to the respective electrical charge segment 102 thus merely serves as a schematic illustration for simplified understanding.

The invention is however not limited to the example embodiment depicted in FIG. 2 and it should be understood that the electrical charge segments 102 may transmit data to the central control unit 106, wireless or by wire, which in turn wirelessly transmits the data to the vehicle 10 on the road 11. Also, the means 108 for detecting a vehicle and its vehicle speed, and the transmitter 110 may be arranged as a single device instead of the two separate devices as depicted in FIG. 2.

Moreover, the vehicle 10 comprises a control unit 112 which comprises a transmitter and a receiver (not shown). The transmitter is arranged to transmit data to each of the electrical charge segments 102 and/or to the central control unit 106. The transmitted data may comprise information that the vehicle is approaching the respective electrical charge segments 102 and at which speed the vehicle 10 is currently driving. Hence, instead of the means 108 for detecting an approaching vehicle 10, the electrical charge segments 102 and/or the central control unit 106 may comprise a receiver for receiving such information from the transmitter of the control unit 112 of the vehicle 10. Furthermore, the receiver of the control unit 112 may receive information from a road system component of the road, i.e. from each of the electrical charge segments 102 and/or from the central control unit 106.

The following will now describe the functionality of the present invention with reference to FIG. 2. When the vehicle 10 is driving on the road 11 provided with the plurality of electrical charge segments 102 there may be situations where the road condition at a specific location of the road 11, i.e. at a specific electrical charge segment 102, is associated with an increased safety risk for the vehicle 10. The increased safety risk for the vehicle may occur if, for example, there is a traffic jam ahead of the vehicle 10 which may be hazardous if the operator of the vehicle 10 is unaware of the situation in advance, or if the road ahead of the vehicle 10 is slippery due to e.g. ice formation or oil spill, etc. Accordingly, the road 11 may be associated with an increased safety risk for the vehicle 10 at, or in the vicinity of, the electrical charge segment(s) 102. The following will denote the electrical charge segment 102 associated with an increased safety risk with numeral 116, which in the example embodiment of FIG. 2 is depicted as comprising ice formation 118 on the electrical charge segment 116.

When the vehicle 10 is driven along the road 11, the electrical charge segments 102, 116, or the central control unit 106, transmit signals 111 to the control unit 112 of the vehicle 10. The signals 111 are indicative of the present operational status of the respective charge segments 102, 116. Hence, the transmitted signal 111 contains information relating to the electrical charge segments 102, 116, and in particular to information/data of the electrical charge segment 102 or its ambient environment that affects the operational status and functionality of the electrical charge segment 102.

According to an example, the transmitted signal 111 may contain information relating to the traffic situation at the electrical charge segment 102, 116. In particular, if the traffic situation is such that there is sudden braking of the vehicles or stopping situations, traffic jams or queue formations at the electrical charge segments 102, 116, the electrical charge segment 102, 116 may not be able to receive charge current thereto.

According to another example, the present operational status of the electrical charge segment 102, 116 may relate to structural properties of the electrical charge segment 102, 116, or a change in structural property of the electrical charge segment 102, 116. The structural properties may relate to mechanical properties and/or electrical properties of the electrical charge segments 102, 116. Mechanical properties may relate to e.g. vibrations, mechanical stress/strain, deformation, etc. of the electrical charge segments 102, 116, while electrical properties may relate to e.g. capacitance, resistance, conductivity, impedance, etc. of the electrical charge segments 102, 116. A further example of a structural property is an indication of the surface temperature of the electrical charge segments 102, 116.

When the control unit 112 of the vehicle 10 receives the signal 111 from the electrical charge segments 102, 116, or the central control unit 106, the control unit 112 compares the present operational status of the electrical charge segments 102, 116 with a predetermined set of rules. The predetermined set of rules may relate to e.g. rules for traffic situations at the electrical charge segment. Such rule may relate to a minimum vehicle speed for the vehicles located at the electrical charge segments 102, 116, i.e. the vehicles located at the electrical charge segments 102, 116 must be travelling at a speed above a minimum threshold limit in order to fulfil the specific rule. A further example of a rule relating to the vehicles located at the electrical charge segments 102, 116 is that the deceleration rate should not exceed a predetermined threshold limit. Hence, the rule is not fulfilled if the vehicles located at the electrical charge segments 102, 116 are decelerating too quickly. A final example of a rule relating to the vehicles located at the electrical charge segments 102, 116 is the distance to a stopped vehicle at the electrical charge segment 102, 116. If the stopped vehicle is positioned within a predetermined distance ahead of the approaching vehicle, the respective rule is not fulfilled.

Further example of the predetermined set of rules may relate to the structural properties of the electrical charge segments 102, 116. For example, a predetermined rule may relate to the surface temperature or a moisture level of the electrical charge segments 102, 116. The rule is not fulfilled if the surface temperature is below a predetermined threshold limit. Further, the predetermined set of rules may relate to changes in electrical and/or mechanical properties of the electrical charge segments 102, 116. If, for example, the capacitance, resistance, impedance, etc. of the electrical charge segments 102, 116 changes too much, i.e. their value deviates too much, the rule relating to electrical properties of the electrical charge segments 102, 116 is not fulfilled. If the electrical charge segment 102, 116 is exposed to increased vibrations or exposed to increased/decreased mechanical stresses/strains, the corresponding rule relating to mechanical properties of the electrical charge segments 102, 116 is not fulfilled if e.g. the vibration level of the electrical charge segment 102, 116 is above a certain limit or an absolute value of the mechanical stresses/strains of the electrical charge segments 102, 116 exceeds a respective predetermined threshold limit, or if a change in electrical and/or mechanical properties is too severe.

If the control unit 112, after comparing the present operational status of the electrical charge segments 102, 116 with the predetermined set of rules, determines that the present operational status of at least one of the electrical charge segment 116 fails to fulfil at least one of the predetermined set of rules, the control unit determines that there is an increased safety risk for the vehicle 10 at the location of the electrical charge segment 116. For example, if it is determined that the surface temperature of the electrical charge segment 116 is below a predetermined threshold limit, this may be associated with an icy road and/or ice formation 118 at the electrical charge segment 116. If, on the other hand, the changes in electrical properties of the electrical charge segment are too severe, this may be associated with corrosion accumulation, snow deposits, chemical spills, water, etc. of the electrical charge segment 116 which may e.g. increase the braking distance or increase the risk of aquaplaning fur the vehicle. According to a further example, if the mechanical properties of the electrical charge segments 116 changes too much, there might be a risk that there is a soil erosion beneath the electrical charge segment 116 which may cause an uneven road surface, or sudden structural failure of the road such as e.g. potholes or sink holes, etc.

When the control unit 112 of the vehicle 10 has determined that the electrical charge segment 116 ahead of the vehicle 10 constitutes an increased safety risk for the vehicle 10, the control unit 112 can provide a signal to a Human-Machine Interface (HMI) with a warning to the operator of the vehicle 10 informing him/her of the upcoming road situation. The warning signal may instead, or in addition, be provided to a Head-Up-Display (HUD) and/or be given as an acoustic signal via the loudspeaker system of the vehicle 10, etc. Other alternative warning to the vehicle operator is also conceivable, such as steering wheel vibrations.

As a further alternative, the control unit 112 of the vehicle 10 can also send a control signal to an active safety system or the like of the vehicle 10. For example, the control unit 112 can send a control signal such that the vehicle speed is reduced before the vehicle arrives at the position of the electrical charge segment 116 determined to constitute an increased safety risk for the vehicle 10. The reduction of the vehicle speed may be realized by controlling the vehicle braking system, the rotational speed of the engine, etc.

Figure 3:
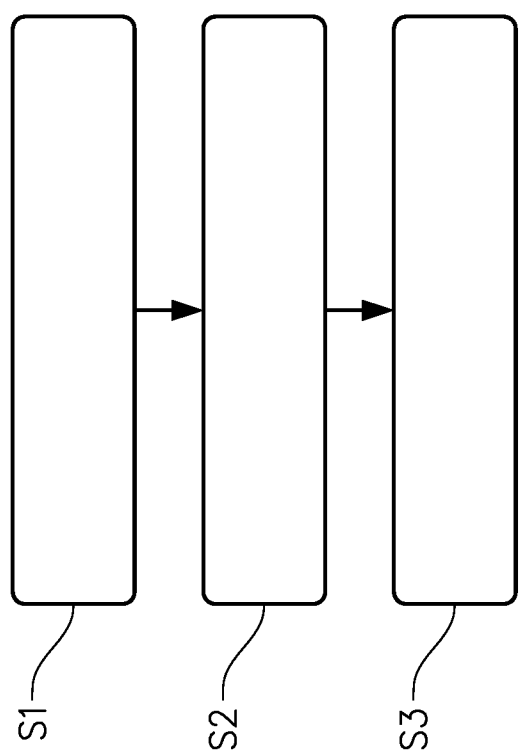
FIG. 3 is a flow chart of a method for detecting an upcoming road situation according to an example embodiment.
Figure 4:
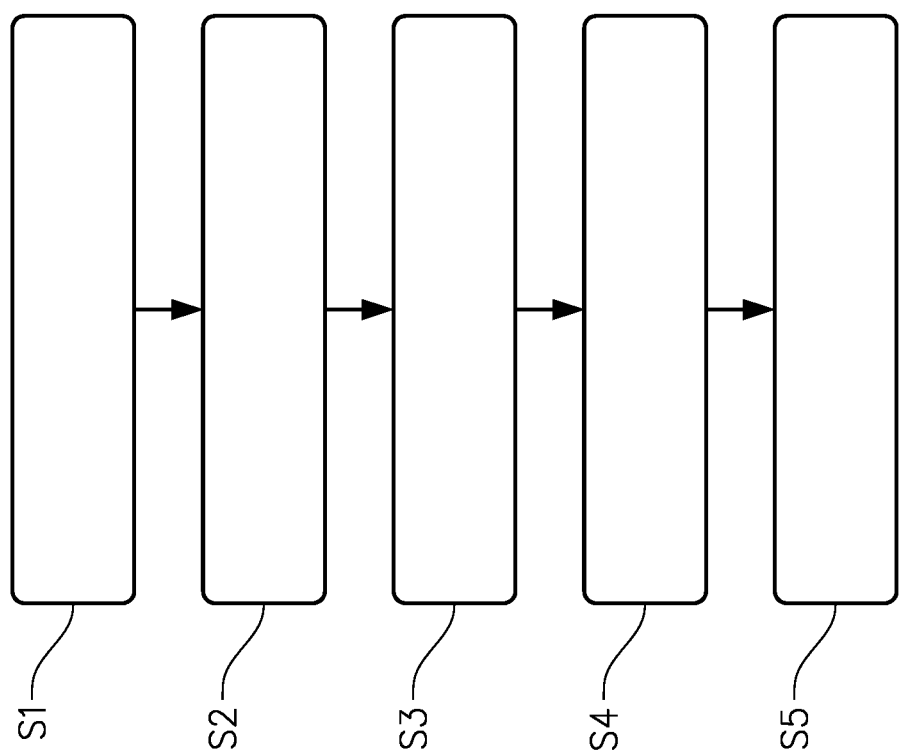
FIG. 4 is a flow chart of a method for detecting an upcoming road situation according to another embodiment.

In order to sum up, reference is made to FIGS. 3 and 4 which illustrate a flow chart of an embodiment of the method for detecting an upcoming road situation. Firstly, and in particular with reference to FIG. 3, the control unit 112 of the vehicle 10 receives S1 a signal 111 from at least one of the electrical charge segments 102, 116 along the road 11 or from the central control unit 106. The signal 111 is indicative of a present operational status of the at least one electrical charge segment 102, 116. Example embodiments of the present operational status of the electrical charge segments 102, 116 are given above. The control unit 112 thereafter compares S2 the received present operational status of the electrical charge segments 102, 116 with a predetermined set of rules. Example embodiments of the predetermined set of rules are also given above. If the present operational status of one of the electrical charge segments 102, 116 fails to fulfil at least one of the predetermined set of rules, the control writ 112 determines S3 that the upcoming road situation at that electrical charge segment 116 constitutes an increased safety risk for the vehicle 10.

With reference to FIG. 4, the steps S1-S3 are executed/performed as described above with reference to FIG. 3, after determining that the upcoming road situation constitutes an increased safety risk for the vehicle 10, the control unit 112 can according to step S4 determine a distance from a current position of the vehicle 10 to the upcoming road situation and according to step S5 control the vehicle speed to be reduced before the vehicle 10 arrives at the electrical charge segment 102, 116 determined to constitute an increased safety risk for the vehicle 10. As an alternative, or complement, to the step of controlling the vehicle speed, the control unit 112 can send a control signal to a HMI, loudspeaker system, etc. of the vehicle to warn the vehicle operator of the upcoming road situation.

It is to be understood that the present invention is not limited to the embodiments described above and illustrated in the drawings; rather, the skilled person will recognize that many changes and modifications may be made within the scope of the appended claims.

The invention claimed is:

1. A method for detecting an upcoming road situation for a vehicle, the vehicle comprising a control unit having a receiver configured to receive transmitted data from road system components along a road for the vehicle, wherein the method comprising:
receiving a signal from at least one electrical charge segment along the road, the signal being indicative of a change in electrical or mechanical properties of the at least one electrical charge segment;
comparing the change in electrical or mechanical properties of the at least one electrical charge segment with a predetermined set of rules; and
determining that the upcoming road situation at the at least one electrical charge segment ahead of the vehicle constitutes an increased safety risk for the vehicle if the change in electrical or mechanical properties of the at least one electrical charge segment ahead of the vehicle fails to fulfil at least one of the predetermined set of rules.

2. The method according to claim 1, wherein the received signal of the present operational status of the at least one electrical charge segment comprising information relating to road specific events at the at least one electrical charge segment.

3. The method according to claims 1, wherein the predetermined set of rules comprising a road specific reference value determining a safety risk for the vehicle.

4. The method according to claim 1, comprising:
determining a distance from a current position of the vehicle to the position of the electrical charge segment determined to constitute an increased safety risk for the vehicle; and
controlling the vehicle speed for the vehicle to be reduced at a predetermined distance before the vehicle arrives at the electrical charge segment.

5. The method according to claim 1, wherein the step of:
providing a signal to a Human-Machine Interface (HMI) of the vehicle for warning a vehicle operator of the increased safety risk for the vehicle.

6. The method according to claim 1, wherein the signal indicative of a present operational status of the at least one electrical charge segment comprising an indication of a surface temperature of the electrical charge segment.

7. The method according to claim 1, wherein the signal indicative of a present operational status of the at least one electrical charge segment comprising vehicle speed data for vehicles located at the at least one electrical charge segment.

8. The method according to claim 1, wherein the predetermined set of rules comprises at least one of a minimum allowable vehicle speed level, maximum deceleration ratio level, or minimum distance to next coming vehicle on the road.

9. A control unit configured to detect an upcoming road situation for a vehicle, the control unit comprising a receiver configured to receive transmitted data from road system components along a road for the vehicle, wherein the control unit is configured to:
receive a signal from a transmitter of at least one electrical charge segment along the road, the signal being indicative of a change in electrical or mechanical properties of the at least one electrical charge segment;
compare the change in electrical or mechanical properties of the at least one electrical charge segment with a predetermined set of rules; and
determine that the upcoming road situation at the at least one electrical charge segment ahead of the vehicle constitutes an increased safety risk for the vehicle if the change in electrical or mechanical properties of the at least one electrical charge segment ahead of the vehicle fails to fulfil at least one of the predetermined set of rules.

10. A computer comprising a computer program for performing the steps of claim 1 when the program is run on the computer.

11. A non-transitory computer readable medium carrying a computer program for performing the steps of claim 1 when the program is run on a computer.

12. A vehicle comprising a control unit according to claim 9.

13. The vehicle according to claim 12, further comprising a charging component adapted to receive electrical charge current from individually controlled electrical charge segments along a road, wherein the charging component is controlled by means of the control unit.

14. The vehicle according to claim 13, wherein the charging component is adapted to conductively receive charge current from the individually controlled electrical charge segments along the road.

15. The vehicle according to claim 13, wherein the control unit is configured to controllably direct the charging component towards the electrical charge segments along the road.

16. The vehicle according to claim 13, wherein the charging component is positioned below the longitudinal frame of the vehicle, wherein the control unit is adapted to controllably direct the charging component towards electrical charge segments positioned in the ground surface of the road.

* * * * *